United States Patent [19]

Kondo

[11] 4,098,134

[45] Jul. 4, 1978

[54] DEVICE FOR MOVING CURVED PLATE BENT IN A SUBSTANTIALLY ARCUATE-SHAPE

[75] Inventor: Osamu Kondo, Aichi, Japan

[73] Assignee: Toyota Jidosha Kogyo Kabushiki Kaisha, Toyota, Japan

[21] Appl. No.: 676,960

[22] Filed: Apr. 14, 1976

[30] Foreign Application Priority Data

Jul. 25, 1975 [JP] Japan .................................. 50-91384

[51] Int. Cl.[2] .............................................. F16H 21/18

[52] U.S. Cl. ........................................ 74/45; 49/227; 74/89.18

[58] Field of Search .................... 74/45, 89.18; 49/227, 49/351

[56] References Cited

U.S. PATENT DOCUMENTS

| | | | |
|---|---|---|---|
| 2,926,905 | 3/1960 | Walhgren | 74/89.13 |
| 3,638,358 | 2/1972 | Mason | 74/89.18 |
| 3,670,454 | 6/1972 | Gebhard | 49/277 |
| 3,842,541 | 10/1974 | Kolke | 49/277 |

*Primary Examiner*—Benjamin W. Wyche
*Assistant Examiner*—Wesley S. Ratliff, Jr.
*Attorney, Agent, or Firm*—Pollock, Vande Sande & Priddy

[57] ABSTRACT

A device for moving a curved plate bent in a substantially arcuate-shape, in which a lift arm driven by a rotary shaft and carrying the curved plate at one end thereof to cause movement of the curved plate is pivotably supported on a pivot mounted on a base, and the axis of this pivot is directed to make an acute angle with the moving plane of the curved plate. In the device, the curved plate carrying end of the lift arm moves along a curved path the curvature of which is substantially equal to that of the curved plate, thereby preventing impartation of a stress tending to cause deformation of the device.

8 Claims, 8 Drawing Figures

DEVICE FOR MOVING CURVED PLATE BENT IN A SUBSTANTIALLY ARCUATE-SHAPE

BACKGROUND OF THE INVENTION

1. Field of the Invention

This invention relates to a device for moving, along a curved path, a curved plate bent in a substantially arcuate-shape such as a curved window glass used in a vehicle or a curved door disposed on a curved surface of a cylindrical container to openably close an opening, and more particularly to a device of the kind above described by which there is no undesirable stress tending to cause deformation of the device itself during movement of the curved plate along the curved path.

2. Description of the Prior Art

It is the present tendency to extensively employ curved window glass of part-cylindrical cross section in automotive vehicles. In a prior art curved plate moving device used for causing vertical movement of such a curved window glass along a curved path, a door frame having the curved path of special shape is generally employed to restrict the movement of the curved window glass so that the window glass can make arcuate movement according to the predetermined curved path along which the window glass is to be guided. However, such a prior art curved plate moving device or so-called window regulator presently used in the art is generally constructed to make linear movement during lifting and lowering of the window glass by a lift arm. Thus, the lift arm in the prior art window regulator is constructed to be capable of elastic deformation or a play of some degree is provided in the connections between various component elements of the window regulator, so that the window glass can make the required arcuate movement along the curved path provided in the door frame. In such a construction, however, a radial force to, or a force in a direction of thickness of, the curved glass is imparted to the glass-runs or the curved path guiding the window glass due to the difference in direction of motion between the window glass making the arcuate movement and the window regulator making the linear movement. Therefore, the prior art construction is defective in that this radial force to the curved glass gives rise to not only undesirable deformation or wear of the glass-run but also undesirable deformation of the window regulator, resulting in difficulty of effecting smooth and reliable operation of the window regulator. Such construction is also applied presently to a device for moving a curved door disposed on a curved surface of a cylindrical container for openably closing an opening of the container and has a defect similar to that above described.

SUMMARY OF THE INVENTION

It is an object of the present invention to provide a novel and improved device for moving a curved plate bent in a substantially arcuate-shape or part-cylindrical cross section such as a curved window glass in a door of a vehicle along a curved path.

The curved plate moving device according to the present invention comprises arm means arranged to swing around a pivot disposed on a base to make a predetermined angle with the base. Due to this arrangement, the locus drawn by the end of the arm means connecting the arm means to the curved plate includes not only an arcuate component in the direction perpendicularly intersecting the thickness of the curved plate but also an arcuate component in the transverse direction or the direction of thickness of the curved plate. Thus, when the arcuate component in the radial direction of the curved plate is suitably selected, it is possible to reduce the tendency of occurrence of distortion of the component elements of the moving device movement of the curved plate. Therefore, the device according to the present invention can stably operate trouble-free over an extended period of time.

While the curved plate moving device of the present invention is applicable to all kinds of structures adapted for moving a curved plate, for example, a window regulator for vehicles having a curved window glass, a door opening device for a structure having a door along a cylindrical surface of a cylinder, and the like, the present invention is especially suitable for application to a window regulator for use in vehicles. Therefore, an application of the present invention to such window regulator is illustrated in the accompanying drawings and referred to in the specification. It is apparent, however, that the present invention is in no way limited to such specific application.

Another object of the present invention is to provide a curved plate moving device which is composed of relatively simple parts and is light in weight and inexpensive. In the device according to the present invention, means for transmitting motion or rotation of a rotary shaft to the arm means comprises an inexpensive pinion and an inexpensive light-weight gear in plate form so that motion can be satisfactorily transmitted from the rotary shaft to the arm means without using expensive and heavy parts such as bevel gears.

Still another object of the present invention is to provide a practical and useful structure of the curved plate moving device which can smoothly and reliably operate. According to this structure, the arm means is arranged to operate in a manner similar to a pantograph so that the curved plate can be moved from one position to another in parallel relation.

A further object of the present invention is to provide a curved plate moving device of structure which is reduced in the transverse width compared with prior art ones. In the present invention, this reduction in the transverse width is attained by bending a lift arm in the arm means at a plurality of portions in the widthwise direction of the device.

DETAILED DESCRIPTION OF THE PRIOR ART

For better and clear understanding of the features of the present invention, one form of prior art window regulator will be described with reference to FIGS. 1 and 2.

Figure 1:
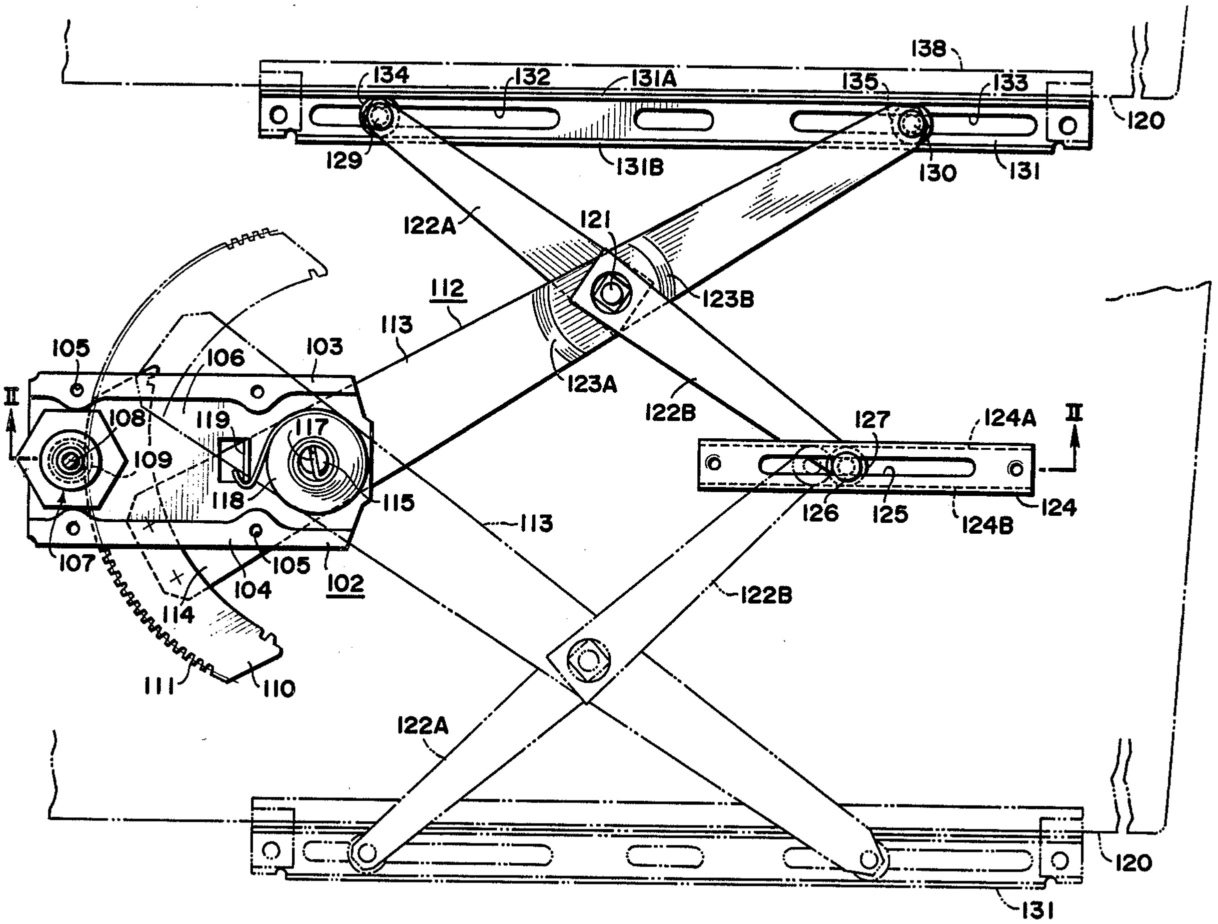
FIG. 1 PRIOR ART
FIG. 1 is a front elevational view showing the structure of a prior art curved plate moving device.
Figure 2:
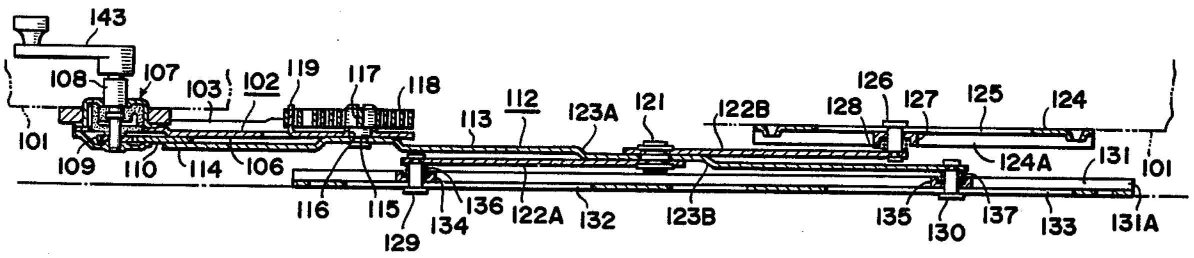
FIG. 2 PRIOR ART
FIG. 2 is a sectional view taken along line II—II of FIG. 1 when a lift arm bracket is situated in the middle of the stroke.

Referring to FIGS. 1 and 2, a prior art window regulator comprises a regulator base 102 which is formed from a plate of material such as steel by working with a press. This regulator base 102 is fixed to the inner surface of an inner panel 101 of a door of a vehicle by conventional fixing means such as screws. The upper and lower edge portions 103 and 104 of this regulator base 102 in FIG. 1 are provided with a plurality of holes 105 for receiving conventional screws (not shown) therein, and a recess 106 is formed between these edge portions 103 and 104 of the regulator base 102. A bearing mechanism 107 comprising a conventional bearing is disposed at one end of this recess 106. A rotary shaft 108 is connected to a regulator handle 143 (FIG. 2) and is rotatably journaled in this bearing mechanism 107. A pinion 109 is fixedly mounted on the lower end of this rotary shaft 108 to make meshing engagement with a driven gear 110. This driven gear 110 is in the form of a sector of steel plate which is toothed at the outer peripheral edge thereof as indicated by 111.

The driven gear 110 is fixed or welded at the non-toothed portion thereof by conventional means such as spot welding to one end 114 of a lift arm 113 constituting part of a pantograph-like lifting mechanism 112. A pivot 115 is fixed as by caulking to the lift arm 113 at a point substantially intermediate between one end 114 and the central portion of the lift arm 113. this pivot 115 is supported rotatably at the lower end thereof in a hole 116 bored in the regulator base 102 adjacent to the other end of the recess 106, that is, the end remote from the end having the bearing mechanism 107 thereon. The upper end portion of the pivot 115 protruding from the regulator base 102 has a diameter larger than that of the lower end supported in the hole 116, and a diametrically extending groove 117 is formed on the surface of the upper end of the pivot 115. A flat spiral spring 118 is anchored at one or inner end thereof in this groove 117 and at the other or outer end thereof to a tongue 119 formed by cutting to raise a part of the central portion of the bottom of the recess 106 of the regulator base 102. A curved plate bent in a substantially arcuate-shape or part-cylindrical cross section, that is, a curved window glass 120 in this case, is connected to the other end of the lift arm 113 by means as described later. Thus, the lift arm 113 is normally urged by the spring 118 in a direction in which it acts to lift the window glass 120 toward the upper position, that is, in a direction in which it swings counter-clockwise around the pivot 115.

A connecting shaft 121 is rotatably supported in or extends through the lift arm 113 at a point substantially intermediate between the pivot 115 and the other end remote from the end at which the lift arm 113 is securely fixed to the driven gear 110. A pair of equalizer arms 122A and 122B each having a length substantially half that of the lift arm 113 are fixed at one end thereof to the opposite end portions respectively of the connecting shaft 121 protruding from the lift arm 113. These equalizer arms 122A and 122B are fixed to the connecting shaft 121 by caulking in such a relationship that they extend in directions opposite to each other to align on the same straight line.

The lift arm 113 includes a pair of spaced stepped portions 123A and 123B which are formed respectively by bending the corresponding parts outwardly in relation to the connecting shaft 121 on the opposite sides of the connecting shaft 121 as seen in FIG. 2. Thus, the portion of the lift arm 113 on one side of the connecting shaft 121 lies in the same plane as that of the equalizer arm 122A, and the portion of the lift arm 113 on the other side of the connecting shaft 121 lies in the same plane as that of the other equalizer arm 122B. In FIGS. 1 and 2, the base portion, or the portion of the lift arm 113 having the pivot 115, lies in the same plane as that of the equalizer arm 122B.

A bracket 124 for cooperating with the equalizer arm 122B is fixed by screws to the inner surface of the inner panel 101 in such a relationship that the longitudinal centerline thereof registers with the line connecting between the rotary shaft 108 and the pivot 115 supporting the lift arm 113. This bracket 124 is provided with a longitudinally extending elongated guide slot 125. A guide pin 126 is slidably received at one end thereof in this guide slot 125. The other end of this guide pin 126 is fixed by caulking to the free end of the equalizer arm 122B. A roller 127 is pivoted on this guide pin 126 so as to make free rolling movement between an upper side wall 124A and a lower side wall 124B of the bracket 124. A compression coil spring 128 is interposed or compressed between this roller 127 and the associated end of the equalizer arm 122B. This spring 128, interposed between the roller 127 and the equalizer arm 122B, acts to maintain the roller 127 in pressure contact with the rear side of the bracket 124. Further, this spring 128 permits slight inclination of the pin 126 on the end of the equalizer arm 122B relative to the longitudinal axis of the bracket 124. Therefore, this end of the equalizer arm 122B can e freely horizontally guided in the guide slot 125 of the bracket 124 while permitting slight inclination of the equalizer arm 122B relative to the bracket 124.

Guide pins 129 and 130 similar to the guide pin 126 are also fixed at one end thereof to the free end of the equalizer arm 122A and lift arm 113 respectively by caulking. These guide pins 129 and 130 are respectively slidably received at the other end thereof in longitudinally extending elongated guide slots 132 and 133 formed in spaced apart relation in a lift arm bracket 131. This lift arm bracket 131 is similarly provided with an upper side wall 131A and a lower side wall 131B. Rollers 134 and 135 similar to the roller 127 are pivoted respectively on the guide pins 129 and 130. These rollers 134 and 135 make rolling movement along the longitudinal axis of the guide slots 132 and 133 between the upper and lower side walls 131A and 131B of the lift arm bracket 131. Compression coil springs 136 and 137 similar to the coil spring 128 are interposed or compressed respectively between the pin-carrying end of the equalizer arm 122A and the roller 134 and between the pin-carrying end of the lift arm 113 and the roller 135. Therefore, these ends of the equalizer arm 122A and lift arm 113 can be freely horizontally guided in the respective guide slots 132 and 133 of the lift arm bracket 131 while premitting slight inclination of the equalizer arm 122A and lift arm 113 relative to the lift arm bracket 131. A channel 138 supporting bottom edge portion of the curved window glass 120 is securely fixed as by screws (not shown) to the lift arm bracket 131.

The operation of the prior art window regulator having such a construction will now be described with reference to FIGS. 1 and 2.

In operation, when the regulator handle 143 is rotated counter-clockwise in FIG. 1, the pinion 109 is rotated in the same direction on the rotary shaft 108, and the driven gear 110 engaged by the pinion 109 is rotated in an opposite direction or clockwise. As a result of rotation of this driven gear 110, the lift arm 113 is caused to swing in the same direction or clockwise around the pivot 115. Therefore, the guide pin 130 fixed ot the bracket-side end of the lift arm 113 acts to urge the lift arm bracket 131 downward while making sliding movement in the guide slot 133 of this bracket 131.

The guide pin 129 fixed to the bracket-side end of the equalizer arm 122A and received in the other guide slot 132 of the lift arm bracket 131 acts to swing the equalizer arm 122A counter-clockwise around the connecting shaft 121 while making sliding movement in the guide slot 132. As a result, the other equalizer arm 122B fixedly connected to the equalizer arm 122A by the connecting shaft 121 swings in the same direction, and the guide pin 126 fixed to the bracket-side end of this equalizer arm 122B makes sliding movement in the guide slot 125 of the equalizer arm bracket 124.

Due to the above movement, the lift arm 113 and the equalizer arm pair 122A, 122B are successively shifted in pantograph-like manner from the position shown by the solid lines in FIG. 1 toward the overlapping position at which the angle therebetween is zero. Then, these arms 113 and 122 are shifted toward the position shown by the two-dot chain lines in FIG. 1. Due to such movement or so-called pantograph-like movement of these arms 113 and 122, the lift arm bracket 131, hence the glass channel 138 securely fixed to this bracket 131 can be continuously moved in the state in which it is maintained in horizontal position. During the clockwise swinging movement of the lift arm 113, hence during the downward movement of the window glass 120, the flat spiral spring 118 anchored at one end thereof to the pivot 115 is wound in the energy accumulating direction thereby alleviating the torque that may be required later for turning the regulator handle 143 in the opposite direction to cause upward movement of the window glass 120.

According to such prior art construction, however, the lift arm bracket 131 engaged by the pin-carrying ends of the lift arm 113 and equalizer arm 122A in the pantographlike lifting mechanism 112 moves along a straight path, whereas the window glass 120 of curved shape or part-cylindrical cross section moves along a curved path, and a stress tending to cause distortion of these parts is imparted to the window regulator. The prior art window regulator has therefore been defective in that repeated upward and downward movement of the window glass 120 results frequently in undesirable deformation and wear of various parts thereby giving rise to difficulty of effecting smooth vertical movement of the window glass 120.

DESCRIPTION OF PRESENTLY PREFERRED EMBODIMENTS

Figure 3:
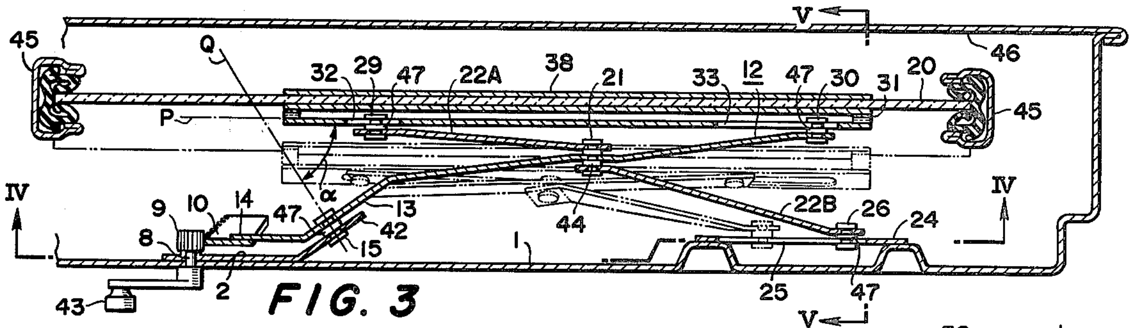
FIG. 3 is a sectional view of the improved apparatus of the present invention taken along line III—III of FIG. 4 showing the structure of an embodiment of the curved plate moving device according to the present invention.
Figure 4:
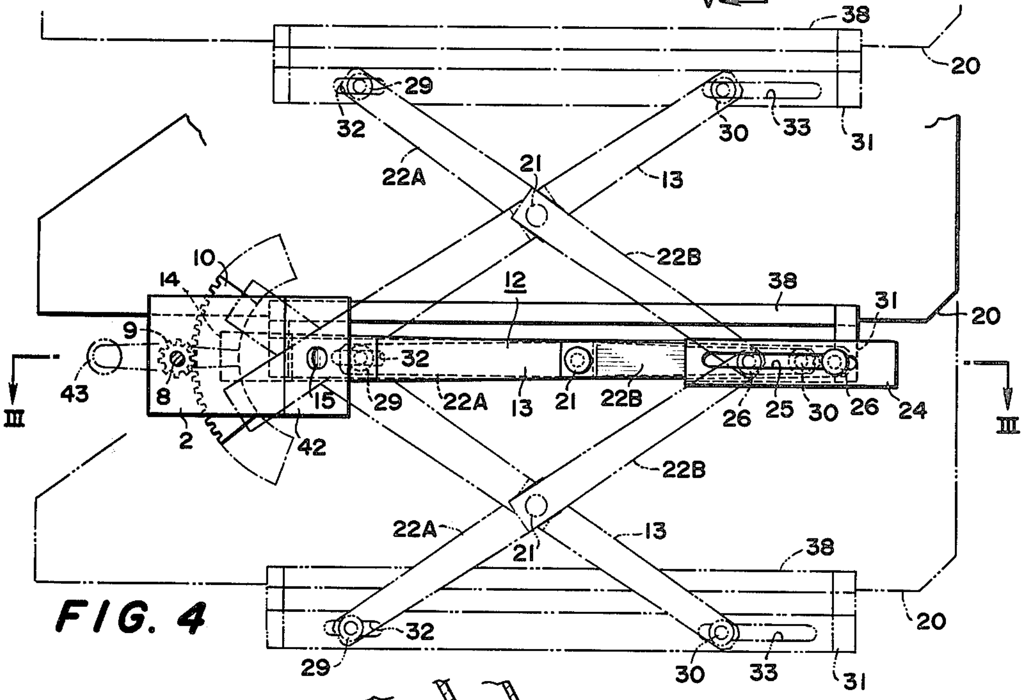
FIG. 4 is a front elevational view taken along line IV—IV of FIG. 3, with an inner panel and an outer panel being omitted for clarification of illustration of the drawing.
Figure 5:
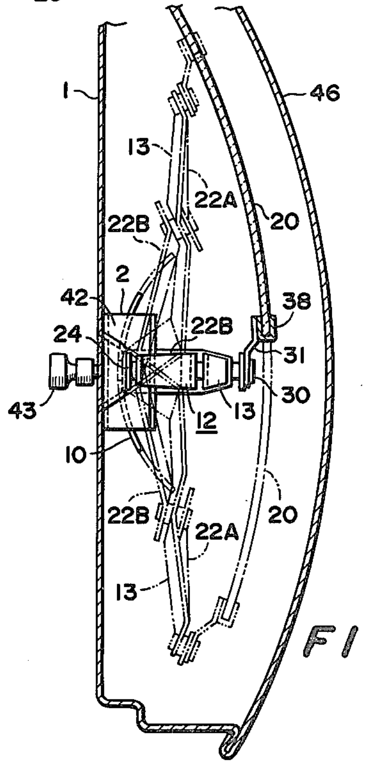
FIG. 5 is a sectional view taken along line V—V of FIG. 3.

The present invention which obviates the prior art defect pointed out above will now be described in detail with reference to FIGS. 3 to 8. FIGS. 3 to 5 show a preferred embodiment of the curved plate moving device of the present invention when applied to a window regulator for moving a curved window glass bent in a substantially arcuate-shape or of part-cylindrical cross section used in a door of a vehicle.

Referring to FIGS. 3 to 5, the window regulator embodying the first preferred form of the present invention comprises a regulator base 2 which is formed from a plate of steel or the like. This regulator base 2 is fixed by conventional means such as spot welding to the inner surface of an inner panel 1 which is a basic member of a door of a vehicle. One end portion of this regulator base 2 extends away from or is raised aslant relative to the inner surface of the inner panel 1 to provide a raised portion 42, and a lift arm 13 constituting part of a pantograph-like lifting mechanism 12 is swingably supported on this raised portion 42 of the regulator base 2 by a pivot 15 at a position adjacent to one end thereof.

A rotary shaft 8, which is freely rotatable, extends through the inner panel 1 and regulator base 2 at a suitable position in the area in which the regulator base 2 is partly superposed on the inner panel 1. A pinion 9 is fixedly mounted on one or inner end portion of the rotary shaft 8 protruding inwardly through the inner panel 1 and regulator base 2, and a regulator handle 43 is firmly fixed to the other or outer end portion of the rotary shaft 8. This pinion 9 is in meshing engagement with a curved driven gear 10 which is in the form of a sector of steel plate toothed at the outer peripheral edge thereof and is welded or otherwise fixed to one end 14 of the lift arm 13. This driven gear 10 is curved in a direction opposite to the curvature of a curved window glass 20 described later, as best shown in FIG. 5.

A pair of equalizer arms 22A and 22B extend in directions opposite to each other to align on the same straight line. These equalizer arms 22A and 22B are connected to each other at one end thereof and to the lift arm 13 by a connecting shaft 21 at a position substantially intermediate between the pivot 15 and the other end of the lift arm 13 so that these equalizer arms 22A and 22B can integrally freely swing relative to the lift arm 13 while being maintained in the aligned relation. A pair of cylindrical spacers 44 are respectively interposed between the confronting surfaces of the lift arm 13 and equalizer arm pair 22A, 22B connected by the connecting shaft 21 so as to ensure smooth swinging movement of the equalizer arm pair 22A, 22B relative to the lift arm 13.

A guide pin 26 is fixed at one end thereof to the other or free end of the equalizer arm 22B in the equalizer arm pair 22A, 22B, and the other end of this guide pin 26 is received slidably in an elongated guide slot 25 extending longitudinally in an equalizer arm bracket 24 fixed to the inner surface of the inner panel 1. Guide pins 29 and 30 similar to the guide pin 26 are also fixed at one end thereof to the free end of the other equalizer arm 22A and lift arm 13 respectively. These guide pins 29 and 30 are respectively slidably received at the other end thereof in longitudinally extending elongated guide slots 32 and 33 formed in spaced apart relation in a lift arm bracket 31 adjacent to the opposite ends. The distance between the connecting shaft 21 and the guide pin 29 is selected to be equal to that between the connecting shaft 21 and the guide pin 30 so that the lift arm bracket 31 can be always maintained in horizontal position.

A glass channel 38 of C-like cross section is firmly fixed to the lift arm bracket 31, and a curved window glass 20 bent in a substantially arcuate-shape or of part-cylindrical cross section is firmly held in this channel 38. This window glass 20 is guided by glass-runs 45 of conventional structure comprising an elastic member of, for example, rubber covered at opposite sides thereof with a steel sheet. Each glass-run 45 is fixed to the inner panel 1 by suitable conventional means (not shown).

The reference numeral 46 in FIGS. 3 and 5 designates an outer panel of the door of the vehicle. A spacer 47 is disposed around the pivot at connection between the lift arm 13 and the regulator base 2 to ensure smooth swinging movement of the lift arm 13 relative to the regulator base 2. Similar spacers 47 are disposed around the guide pins at the connections between the lift arm 13 and the lift arm bracket 31, between the equalizer arm 22A and the lift arm bracket 31, and between the equalizer arm 22B and the equalizer arm bracket 24 for servicing the same purpose.

It will be seen from FIG. 3 that the centerline of the glass channel 38 holding the window glass 20, hence the centerline P of the lift arm bracket 31 makes an acute angle $\alpha$ less than 90° with the centerline or axis Q of the pivot 15.

It will be seen further that the lift arm 13 is suitably bent at a plurality of portions adjacent to the pivot 15, connecting shaft 21 and guide pin 30, and the equalizer arms 22A and 22B are also suitably bent at a plurality of portions adjacent to the guide pins 29 and 26 and connecting shaft 21, so that the width of the window regulator in the transverse direction can be reduced and the glass channel 38 holding the window glass 20 can make predetermined arcuate movement.

The operation of the first embodiment of the present invention will now be described with reference to FIGS. 3 to 5.

In operation, when the regulator handle 43 is rotated clockwise in FIG. 4, the rotary shaft 8 is rotated to cause rotation of the pinion 9 is the same direction, and the driven gear 10 engaged by the pinion 9 is rotated counter-clockwise around the pivot 15. As a result of rotation of the driven gear 10, the lift arm 13 is caused to swing counter-clockwise around the pivot 15. Therefore, the guide pin 30 fixed to the bracket-side end of the lift arm 13 acts to urge the lift arm bracket 31 upward from the position shown by the solid lines in FIG. 4 while making sliding movement toward the inner end of the guide slot 33. With this swinging movement of the lift arm 13, the equalizer arms 22A and 22B are urged to swing clockwise around the connecting shaft 21 which connects these equalizer arms 22A and 22B to each other through the lift arm 13. Due to the fact that these arms 13 and 22 are arranged to make so-called pantograph-like movement, the lift arm bracket 31 is shifted in parallel relation from the position shown by the solid lines toward the position shown by the one-dot chain lines while being maintained in horizontal position.

According to the present invention, the angle $\alpha$ defined between the centerline P of the lift arm bracket 31 and the axis Q of the pivot 15 is not 90° but less than 90°, and thus, the lift arm 13 is caused to swing around the pivot 15 in the state in which it is inclined relative to the inner panel 1. Therefore, the bracket-side end of the lift arm 13 makes arcuate movement not only in the direction intersecting at the right angle to the thickness of the window glass 20 but also in the direction of the thickness of the window glass 20 so that the glass channel 38 can be reliably moed along a curved path. In this case, the angle $\alpha$ may be suitably determined so that the arc drawn by the bracket-side end of the lift arm 13 can be made equal to the curvature of the window glass 20.

There now will be described the manner in which the guide pin 30 and lift arm bracket 31 are moved in response to the movement of the lift arm 13. Assume that from its horizontal position, the lift arm 13 is swung upwardly. The guide pin 30 secured at the extreme end of the lift arm 13, then rises along an arc centering on the pivotal axis 15. Accordingly, as can be observed in FIG. 3, as arm 18 gradually rises, the segmental line between the guide pin 30 and the pivot axis 15 will be gradually decreased in length as projected on the horizontal plane in both directions — transversely of the curved plate holding means 38 (or in the direction toward or apart from the inner panel 1, in FIG. 3) and perpendicularly thereto (or in the direction of P, in FIG. 3). The two movements of the guide pin 30 in the upward direction and perpendicularly to the window glass 20, in combination, result in its tracing a curved surface similar to that of the window glass 20. Meanwhile, the window glass 20 which has been guided for movement by the glass-runs 45, is brought more and more closely toward the inner panel 1 as it is raised. If, therefore, the apparatus is designend to provide that both of the members, i.e. the window glass 20 and guide pin 30, attain equal rates or manner of approach toward the inner panel 1, there will never be a distorting force that otherwise would be possibly applied to the arm while the window glass 20 is in motion. Such equal rate of approach is attainable by an appropriate selection of the angle $\alpha$. Also, the gradual decrease in horizontally projected length of the guide pin 30 in the lengthwise direction (or in the direction of P, in FIG. 3) can be absorbed by the sliding movement of the guide pin 30 in the guide slot 33, so that no distorting force or bias is imparted to the arm means 12 (13).

In the present invention, the axis of the pivot 15 is not parallel with that of the rotary shaft 8 but makes an angle with the latter, and rotation of the rotary shaft 8 may be transmitted to the pivot 15 by a train of bevel gears. However, employment of a driven gear 20 in curved plate gear form as shown is advantageous in that rotation of the rotary shaft 8 can be smoothly and reliably transmitted to the pivot 15 by an inexpensive part.

Figure 6:
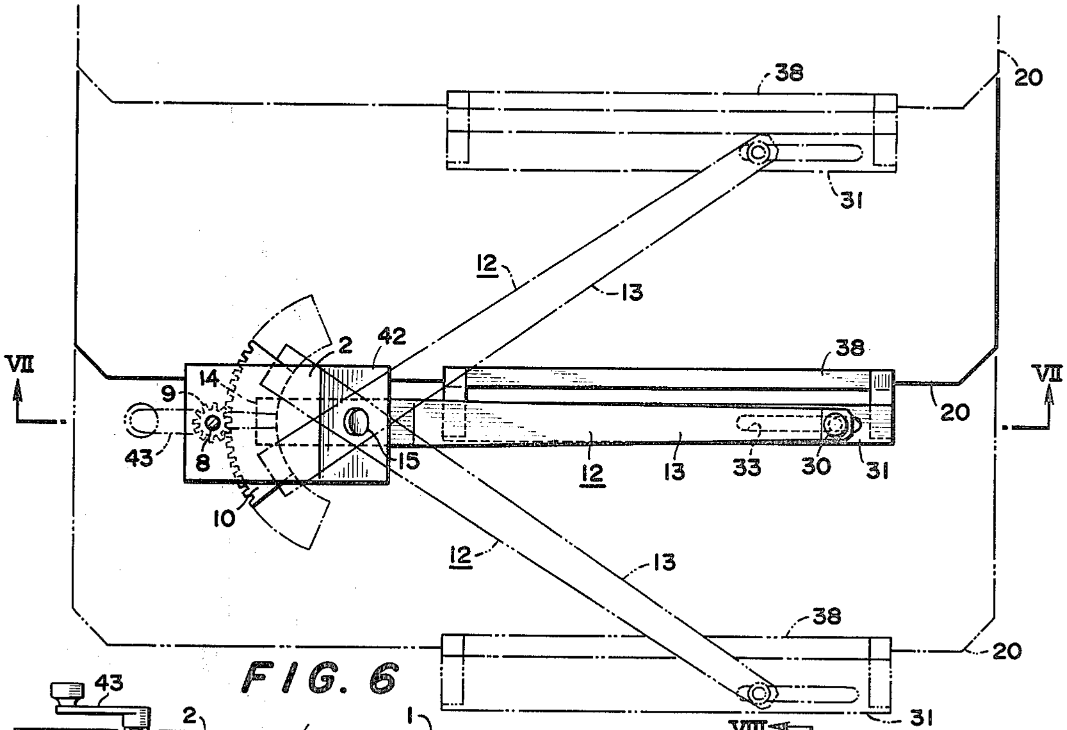
FIG. 6 is a front elevational view showing the structure of another embodiment of the present invention.
Figure 7:
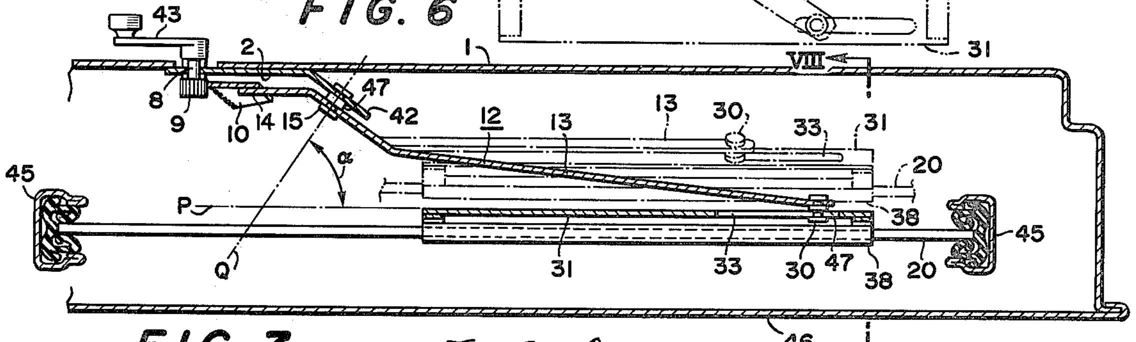
FIG. 7 is a sectional view taken along line VII—VII of FIG. 6.
Figure 8:
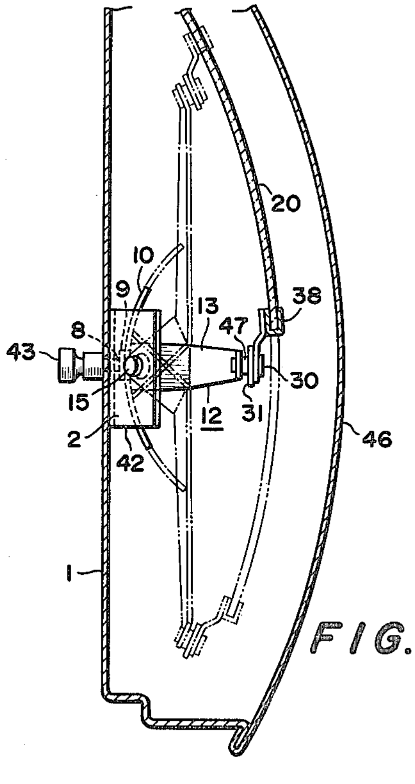
FIG. 8 is a sectional view taken along line VIII—VIII of FIG. 7.

Another embodiment of the curved plate moving device of the present invention, when applied to a window regulator for moving a curved window glass bent in a substantially arcuate-shape used in a door of a vehicle, will be described with reference to FIGS. 6 to 8. In FIGS. 6 to 8, the same reference numerals are used to denote the same parts appearing in FIGS. 3 to 5 as this second embodiment is a partial modification of the first embodiment.

This second embodiment differs merely from the first embodiment in that the equalizer arms 22A and 22B in the first embodiment are eliminated, and thus, the operation thereof is similar to that of the first embodiment. However, due to the elimination of the equalizer arms, the lift arm bracket 31 in the second embodiment is arranged to move while maintaining its horizontal position by being restricted by the glass-runs 45 holding the opposite sides of the window glass 20.

It will be seen in FIG. 7 that, in this second embodiment too, the angle $\alpha$ defined between the centerline P of the lift arm bracket 31 and the centerline or axis Q of the pivot 15 is not 90° but less than 90° or acute.

The embodiments above described have referred to an application of the present invention to vehicle window regulators. It is apparent, however, that the present invention is in no way limited to such specific embodiments and is similarly effectively applicable to any other devices for moving a curved plate of other material along a curved path, for example, a device for actuating a door provided for openly closing an opening formed in a curved surface of a cylindrical container.

We claim:

1. A device for moving a curved plate of uniform curvature along a curved path comprising:
   (a) a base panel;
   (b) curved plate holding means for holding said curved plate disposed in substantially parallel relation and predetermined spaced relation with said base panel;
   (c) a rotary shaft rotatably mounted on said base panel;
   (d) a pivot shaft mounted on said base panel with the axis thereof inclined at a predetermined angle with the axis of said rotary shaft, said axis of the pivot shaft as extended making an acute angle with said curved plate holding means wherever the holding means is positioned along its traveling path;
   (e) arm means pivotably mounted at an intermediate portion thereof on said pivot shaft and having a distal end portion bent substantially parallel to said curved plate holding means;
   (f) rotation transmission means for transmitting the rotation of said rotary shaft to the end of said arm means opposite to said distal end thereby causing swinging movement of said arm means around said pivot shaft;
   (g) a guide pin fixed substantially upright on said bent end portion of the arm means;
   (h) arm bracket means secured to said curved plate holding means and having an elongated guide slot for receiving said guide pin on said arm means to permit only lateral sliding movement therethrough; and
   (i) curved plate guiding means for guiding the curved plate along a predetermined curved path defined thereby, whereby as said arm means rotates, said curved plate holding means is adapted to move substantially parallel to the curvature of the curved plate.

2. A device as claimed in claim 1, wherein said rotation transmission means comprises:
   (a) a pinion fixed to said rotary shaft; and
   (b) a gear in plate form fixed to said one end of said arm means to make meshing engagement with said pinion and curved in a direction opposite to the curvature of said curved plate.

3. A device as claimed in claim 1, wherein said arm means comprises a single lift arm.

4. A device as claimed in claim 1, wherein said arm means comprises:
   (a) a connecting shaft rotatably mounted to said lift arm at a position substantially intermediate between the pivoted portion and said other end associated with said curved plate, said connecting shaft protruding at opposite ends from said lift arm;
   (b) a first equalizer arm fixed at one end thereof to one end of said connecting shaft;
   (c) a second equalizer arm fixed at one end thereof to the other end of said connecting shaft and extending in a direction opposite to the extending direction of said first equalizer arm to align with said first equalizer arm on the same straight line;
   (d) guide means disposed on said base panel for guiding the other end of said second equalizer arm in opposite directions; and
   (e) curved plate holding means for holding said curved plate and guiding said end of said lift arm asociated with said curved plate together with the other end of said first equalizer arm in a direction parallel with the moving direction of the other said end of said second equalizer arm;

whereby said arm means makes movement similar to that of a photograph.

5. A device as claimed in claim 3, wherein said lift arm is bent at a plurality of selected portions in the transverse direction of the device thereby reducing the thickness of the device.

6. A device as claimed in claim 4, wherein said lift arm and said first and second equalizer arms are bent at a plurality of selected portions in the transverse directions of the device thereby reducing the thickenss of the device.

7. A device for moving a curved plate of uniform curvature along a path comprising:
   (a) a base panel;
   (b) a curved plate holding frame for holding said curved plate disposed in substantially parallel relation and predetermined spaced relation with said base panel, said curved plate having a C-shaped cross section;
   (c) a rotary shaft rotatably mounted on said base panel substantially perpendicularly thereof and having a regulator handle secured at one end thereof and a pinion at the other end;
   (d) a pivot shaft mounted on said base panel with its axis inclined to form an acute angle with the axis of said rotary shaft, said axis of the pivot shaft also forming an acute angle with said curved plate holding frame wherever said curved plate holding frame is positioned along its traveling path;
   (e) a lift arm pivotably mounted at an intermediate portion thereof on said pivot shaft for rotation in a plane extending substantially at a right angle with the axis of said pivot shaft, said lift arm having one end portion substantially parallel to said base panel and the other end portion substantially parallel to said curved plate holding frame;
   (f) a plate-like driven gear secured at said one end bent portion of the lift arm and engaging said pinion of the rotary shaft for transmitting the rotation of the rotary shaft to the lift arm, said plate-like driven gear being in the form of a sector curved in a direction opposite to the curvature of said curved plate;
   (g) a guide pin fixed substantially upright on said bent end portion of the arm means;
   (h) a lift arm bracket secured to said curved plate holding frame substantially parallel thereto and having an elongated guide slot for receiving said guide pin fixed on the arm means to permit only lateral sliding movement therethrough; and
   (i) a pair of glass-runs disposed sidewise of the curved plate held by the curved plate holding frame which defines a predetermined curved path for the curved plate and conducts the movement of the curved plate along said curved path, said glass-runs comprising elastic members in sliding contact with the curved plate, whereby as said arm means rotates, said curved plate holding frame is adapted to move substantially parallel to the curvature of the curved plate.

8. A device for moving a curved plate of uniform curvature along a curved path comprising:

(a) a base panel
(b) a curved plate holding frame for holding said curved plate disposed in substantially parallel relation and predetermined spaced relation with said base panel, said curved plate having a C-shaped cross section;
(c) a rotary shaft rotatably mounted on said base panel substantially perpendicularly thereof and having a regulator handle secured at one end thereof and a pinion secured at the other end;
(d) a pivot shaft mounted on said base panel with the axis thereof being inclined to form an acute angle with the axis of said rotary shaft, said axis of the pivot shaft also forming an acute angle with said curved plate holding frame wherever said curved plate holding frame is positioned along its traveling path;
(e) a lift arm pivotably mounted at an intermediate portion thereof on said pivot shaft for rotation in a plane extending substantially at a right angle with the axis of said pivot shaft, said lift arm having one end portion substantially parallel to said base panel and the other end portion substantially parallel to said curved plate holding frame;
(f) a plate-like driven gear secured at said one end bent portion of the lift arm and engaging said pinion of the rotary shaft for transmitting the rotation of the rotary shaft to the lift arm, said plate-like driven gear being in the form of a sector curved in a direction opposite to the curvature of said curved plate;
(g) a first guide pin fixed substantially upright on said bent end portion of the arm means;
(h) a connecting shaft rotatable and extending perpendicularly through the lift arm at a point substantially intermedite between the pivot shaft and the bent end portion so as to be substantially parallel to the curved plate holding frame;
(i) a first equalizer arm secured at one end of said connecting shaft facing the curved plate holding frame and having the extreme end portion substantially parallel to said base panel;
(j) a second equalizer arm secured at one end of said connecting shaft facing the curved plate holding frame and having the extreme end portion substantially parallel to said base panel;
(j) a second equalizer arm secured at the other end of said connecting shaft facing the base panel and extending in the direction opposite to and in alignment with the first equalizer arm, said second equalizer arm having the extreme end portion substantially parallel to said bent end portion of the lift arm;
(k) a second guide pin secured at the bent end portion of said first equalizer arm and being substantially perpendicular thereto and toward the curved plate holding frame;
(l) a third guide pin secured at the bent end portion of said second equalizer arm and being substantially perpendicular thereto and toward the base panel;
(m) an equalizer arm bracket secured at said base panel and having an elongted guide sot substantially parallel to the end portion of said first equalizer arm, said guide slot being adapted to guide said third guide pin only for lateral sliding movement therethrough;
(n) a lift arm bracket secured to said curved plate holding frame substantially parallel thereto and having an elongated guide slot for receiving said first guide pin fixed at said bent end portion only for lateral, sliding movement therethrough, while having another elongated guide slot for guiding said second guide pin only for lateral, sliding movement therethrough;
(o) spacers disposed around the first, second and third guide pins, respectively, as interposed between the bent end portion of the lift arm and end portion of the lift arm bracket; the extreme end of the first equalizer arm and lift arm bracket; and between the bent end portion of the second equalizer arm and equalizer arm bracket, and
(p) a couple of glass-runs disposed sidewise of the curved plate held by the curved plate holding frame, which defines a predetermined curved path for the curved plate and conducts the movement of the curved plate along said curved path, said glass-runs comprising elastic members in sliding contact with the curved plate, so that as said arm means rotates, said curved plate holding frame is adapted to move substantially parallel to the curvature of the curved plate.

* * * * *